(12) United States Patent  
Black (10) Patent No.: US 6,526,598 B1  
(45) Date of Patent: Mar. 4, 2003

(54) SELF-CONTAINED VENTING TOILET

(76) Inventor: Robert V. Black, 601 Isle of Palms, Ft. Lauderdale, FL (US) 33301

( * ) Notice: Subject to any disclaimer, the term of this patent is extended or adjusted under 35 U.S.C. 154(b) by 157 days.

(21) Appl. No.: 09/867,938

(22) Filed: May 30, 2001

(51) Int. Cl.[7] .................................................. E03D 9/04
(52) U.S. Cl. ................... 4/214; 4/215; 4/217
(58) Field of Search ........................ 4/214, 215, 217, 4/209 R; 416/169 R, 170 R; 415/123, 122.1, 202

(56) References Cited

U.S. PATENT DOCUMENTS

| 669,062 | A | * | 2/1901 | Drouillard |
| 725,425 | A | * | 4/1903 | Drouillard et al. |
| 900,831 | A | * | 10/1908 | Charlton |
| 908,393 | A | * | 12/1908 | Cline |
| 955,518 | A | * | 4/1910 | Lauphear |
| 996,906 | A | * | 7/1911 | Blanchard |
| 1,087,228 | A | * | 2/1914 | Ferguson |
| 1,520,554 | A | * | 7/1924 | Ankeny et al. |
| 1,539,573 | A | * | 5/1925 | Jeffries |
| 2,603,797 | A | * | 7/1952 | Baither |
| 4,103,370 | A | * | 8/1978 | Arnold |
| 4,463,555 | A | * | 8/1984 | Wilcoxson |
| 4,467,217 | A | * | 8/1984 | Roussey |
| 4,923,368 | A | * | 5/1990 | Martin |
| 5,249,923 | A | * | 10/1993 | Negus |
| 5,689,837 | A | * | 11/1997 | Katona |
| 5,947,678 | A | * | 9/1999 | Bergstein |
| 6,099,255 | A | * | 8/2000 | Lee |
| 6,139,267 | A | * | 10/2000 | Sedlacek et al. |
| 6,309,179 | B1 | * | 10/2001 | Holden |

FOREIGN PATENT DOCUMENTS

| FR | 1147836 | * | 11/1957 | ................ 4/214 |
| GB | 603559 | * | 6/1948 | ................ 4/214 |
| IT | 349412 | * | 6/1937 | ................ 4/214 |

* cited by examiner

Primary Examiner—Gregory L. Huson
Assistant Examiner—Khoa D. Huynh
(74) Attorney, Agent, or Firm—Oltman, Flynn & Kubler (57) ABSTRACT

A venting toilet having a conventional ceramic bowl and flushing tank arrangement includes a water powered odor exhaust system which withdraws gases from the toilet bowl. A suction blower powered by a water motor through which the refill water to the toilet tank flows following flushing is arranged to draw odorous gases from the toilet bowl through a pair of intake manifolds built into the top of the bowl below the seat. The odorous gasses are delivered to the sewer system downstream of the water trap. An energy storage device containing a clock spring wound by the water motor, and a gear box are connected between the water motor and the suction blower, allow operating of the suction blower to draw odors from the toilet bowl even when the toilet has finished refilling.

21 Claims, 6 Drawing Sheets

SELF-CONTAINED VENTING TOILET

BACKGROUND OF THE INVENTION

1. Field of Invention

The present invention relates to flush toilets which include a device for controlling odor, and more particularly to those flush toilets having an exhaust fan or blower as the odor control device, which blower removes odorous gases from within the toilet bowl.

2. Description of Related Art

A variety of devices have been devised over the years for removing odorous air or gases from toilets, and from the space surrounding the toilet referred to as a water closet.

Deodorants

One approach to solving the odor removal problem around toilets, particularly in public or business establishments, is to place solid bars of deodorant within or adjacent the toilet. Alternatively, various misting devices have been developed which are mounted on the wall adjacent the toilet to periodically spray a mist of a deodorizing liquid into the air. While both the solid and the liquid deodorizers do help mask the undesirable odor, the odor is typically still detectable in the air even with strongly scented deodorants, and thus this approach is only marginally effective.

Ceiling Exhaust Fans

Another approach to solving the odor removal problem around toilets is to mount a suction blower in the ceiling of the room containing the toilet such as a bathroom. A wall mounted switch controls the suction blower to exhaust odorous gases present in the bathroom to the exterior of the building. This approach works to a degree, but has some serious shortcomings. For example, the odorous gases are allowed to circulate. throughout the air in the bathroom prior to being removed and exhausted. Therefore, the person using the toilet must smell the odorous gases in the air which can be quite unpleasant. Secondly, this approach necessitates removing most or all of the air from the bathroom to remove the odorous gases, which is a quantity of air at least equal to that contained in the bathroom, typically two to three times as much. The air contained in the bathroom is typically heated air in the winter, which must be replaced with more heated air causing an increase in the heating and/or electric bill. In the summer, this air might be cooled air such as in an air conditioned building, which air must be replaced with more cooled air causing an increase in the electric bill for air conditioning.

Toilets With Built-in Air Flow Devices

Electrically Powered Blowers: The more effective odor control systems remove odorous gases directly from the toilet bowl, which gases are exhausted to the sewer system down-stream of the water trap and siphon seal in the toilet bowl. One approach is to provide an electrically powered suction blower within the structure of the toilet. The odorous gases are withdrawn from the bowl by the suction blower through an intake port or manifold and suitable exhaust conduit. A one-way valve is typically positioned in the exhaust conduit to prevent the backflow of sewer gases into the toilet. The electric suction blower necessitates the availability of an electrical wall socket or another source of electricity. Examples of such toilets with built-in suction blowers which deposit the odorous gases into:the sewer pipe include U.S. Pat. Nos. 6,073,275 issued to Klopocinski, and 4,103,370 issued to Arnold. In some odor control systems, the odorous gases are withdrawn from the toilet bowl, passed through a charcoal filter, and returned to the room with or without additional deodorizing. Such a system is shown in U.S. Pat. No. 3,594,826 issued to Maurer.

Other Air Flow Devices: Toilets with built-in air flow devices other than electrically powered suction blowers have been designed. In U.S. Pat. No. 2,309,925 issued to Schotthoefer is disclosed a toilet having an air flow device which uses falling drops of water to produce a downdraft of air which draw away odorous gases from within the toilet bowl.

Toilets With Separate External Blower Systems

An alternative to having an electrically powered suction blower built into the structure of the toilet is to provide a separate external blower system. The odorous gases are withdrawn from the toilet bowl by the external suction blower through an intake port or manifold and suitable exhaust conduit. The odorous gases are typically exhausted back into the bathroom after an attempted deodorizing, or into a separate exhaust conduit leading outside the building. Examples of external blower systems for toilets include U.S. Pat. Nos. 6,052,837 issued to Norton et al., and 5,875,497 issued to Lovejoy. Both of these patented devices use a special seat which includes an intake manifold for withdrawing the odorous gases from within the toilet. A problem with such external suction blower systems is that they exhaust the supposedly deodorized gases back into the bathroom. Such requires periodic replacement of deodorizer blocks or liquid deodorizer and is only marginally effective in deodorizing the odorous gases. If the odorous gases are to be exhausted to the exterior of the building, a separate exhaust duct must be constructed into the building, since such external suction blower systems are typically not connectable directly to the sewer pipe without major modifications to the toilet.

There is a need for an odorless toilet which does not require electricity to operate, and for a ventilation system to retrofit existing toilet designs and installed toilets for odor removal which requires no electricity to operate.

SUMMARY OF INVENTION

1. Advantages of the Invention

One of the advantages of the present invention is that it utilizes the same water source necessary to operate the toilet, capturing water flow energy which is normally wasted to eliminate odorous gases from the toilet.

Another advantage of the present invention is that no external or internal source of electricity is required, such as a wall socket or batteries, thus presenting no electrical shock hazard and not requiring periodic replacement of batteries.

A further advantage of the present invention is its adaptability to most standard toilet designs, being manufactured as an integral part of the toilet, or as a retrofit or add-on such as in the form of a kit for preexisting toilet designs and for toilets already installed.

Yet another advantage of the present invention is its ability to extract and store energy from the flow of water during flushing and refilling of the flush water tank, the energy being available for later use when the water flow has stopped after the tank has refilled.

Another advantage of the present invention is its ability to capture odorous gases before they exit the toilet to disperse into the air in the bathroom.

A further advantage of the present invention is the elimination of exhausting a large volume of heated or air conditioned air from the bathroom during use.

Yet another advantage of the present invention is the elimination of the need to cut holes in walls and ceiling for installing an exhaust fan, wall switches, and the associated electrical wiring.

These and other advantages of the present invention may be realized by reference to the remaining portions of the specification, claims, and abstract.

2. Brief Description of the Invention

The present invention comprises a ventilation system for removing odors from a water closet or toilet, and a self-contained venting toilet which incorporates the ventilation system. The toilet is of the type having a water supply tank, and a bowl with a hollow flush ring manifold adjacent the top of the bowl. The flush ring manifold includes an inlet opening and a plurality of flushing water discharge openings facing inwardly into the bowl. A flushing conduit connects the bowl to the tank. A discharge conduit connects the bowl with a siphon outlet which connects to a sewage waste drain. The discharge conduit includes an odor trap to prevent odors from passing from the sewage waste drain back to the bowl. A water control mechanism controls the supply of water under pressure from an external water supply pipe and the level of flushing water within the tank. A flushing mechanism includes a valve controlled outlet to the flushing conduit and the flushing ring manifold, adapted to discharge the water contained in the tank into the bowl. A seat pivotally is mounted on the bowl for movement between a horizontal position over the bowl and an elevated substantially vertical position at the rear of said bowl and adjacent the tank.

The ventilation system is adapted to exhaust gases and odors from within the bowl to the siphon outlet and into the sewage waste drain. The ventilation system includes an exhaust conduit communicating between the bowl and the siphon outlet. A blower assembly is operatively connected to and powered by the supply of water from the external water supply pipe when the water control mechanism is allowing the flow of water under pressure from the external water supply pipe to refill the level of flushing water within the tank. The. blower assembly is interposed along the exhaust conduit to induce a flow of air within the exhaust conduit toward the siphon outlet and into the sewage waste drain.

A preferred version of the ventilation system includes a fluid motor which is connected to the water supply pipe to extract kinetic energy taken from the flushing water flowing through the water supply pipe when the water control mechanism is allowing the flow of water under pressure from the external water supply pipe to refill the level of flushing water within the tank. The fluid motor is operatively connected to an energy storage device to supply kinetic energy to the energy storage device while tank of the toilet is being refilled following flushing. The kinetic energy is stored as potential energy by one or more spiral clock springs in the energy storage device, which is operatively connected to power the fan of the blower assembly through a gear box. The energy storage device includes a release mechanism which locks the releasing of the stored potential energy until release thereof is desired. The release mechanism can be operatively connected to the flushing mechanism for actuation when the flushing mechanism is actuated, or the release mechanism can be actuated by a lever accessible externally of the toilet, but separately from the flushing mechanism. This allows operation of the ventilation system even when flushing water is not flowing through the water supply pipe following flushing of the toilet by utilizing the stored potential energy within the energy storage device. A one-way valve is interposed along the exhaust conduit to prevent the flow of air within said exhaust conduit away from the siphon outlet and back into the bowl.

The preferred version of the ventilation system is incorporated into a preferred version of the self contained venting toilet, the toilet having a pair of elongate intake manifolds integral with and adjacent the top of the bowl. The intake manifolds extend at opposite sides of the bowl around at least a portion of the periphery of the bowl, the intake manifolds each having a plurality of intake holes along the length thereof. The exhaust conduit communicates with the bowl through the intake manifolds.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

The present invention provides a self-contained venting toilet wherein odors are removed by an integral ventilation system which needs no electricity to operate. An intake manifold is provided around the periphery of the bowl, together with an exhaust conduit communicating between this manifold and a suction blower installed in the tank portion of the toilet powered by a spring motor which is rewound each time the toilet is flushed. The exhaust conduit leads to the sewer system or to an exhaust duct leading outside of the buildings.

Standard Toilet Components

Figure 1:
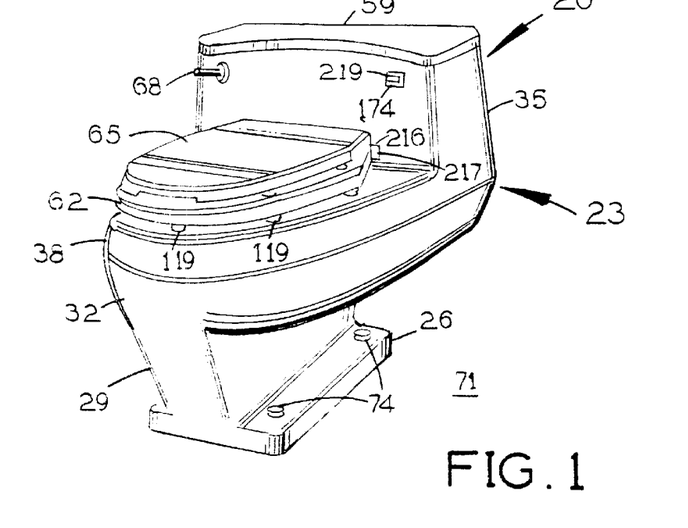
FIG. 1 is substantially a perspective front quarter view of a self contained venting toilet incorporating the ventilation system of the present invention.
Figure 2:
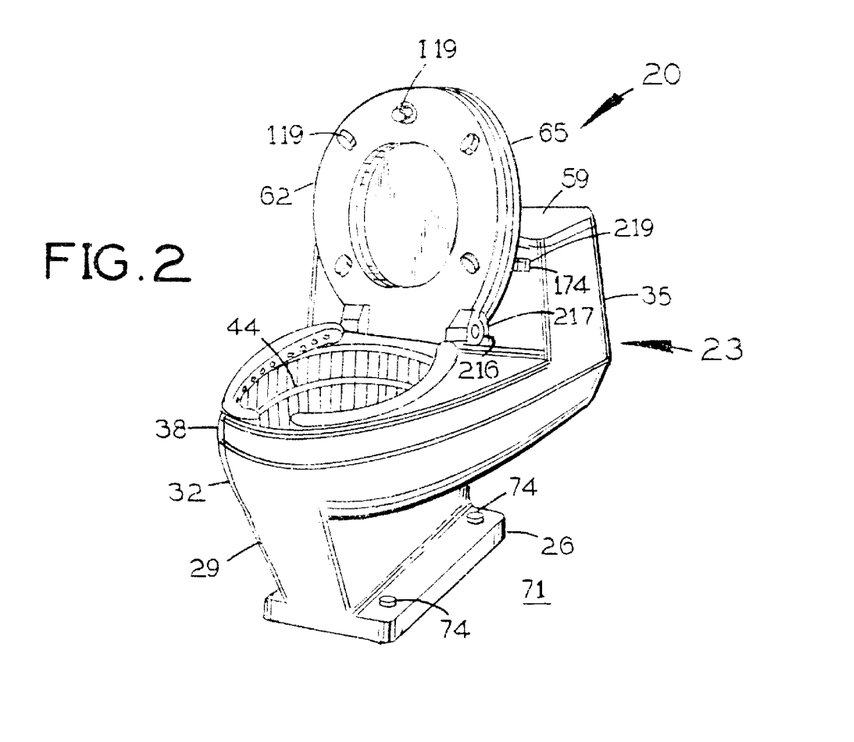
FIG. 2 is substantially a perspective front quarter view of the toilet corresponding to FIG. 1, but with the seat cover and the toilet seat elevated to a vertical position showing the intake manifolds of the ventilation system at the top periphery of the bowl.
Figure 3:
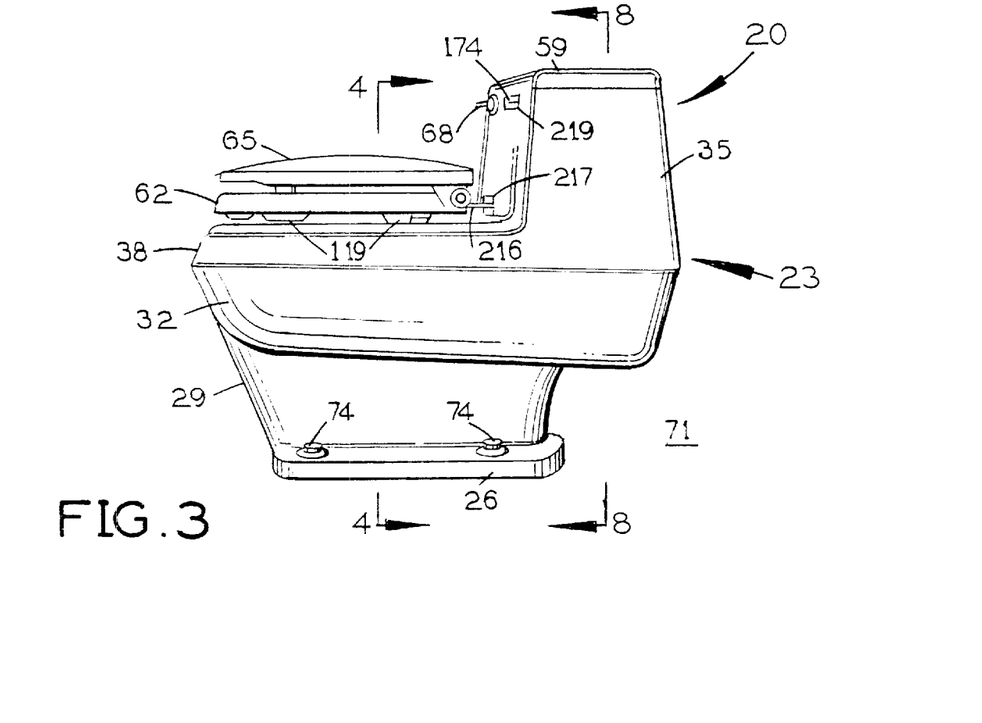
FIG. 3 is substantially a perspective view of the toilet approaching side elevation.
Figure 4:
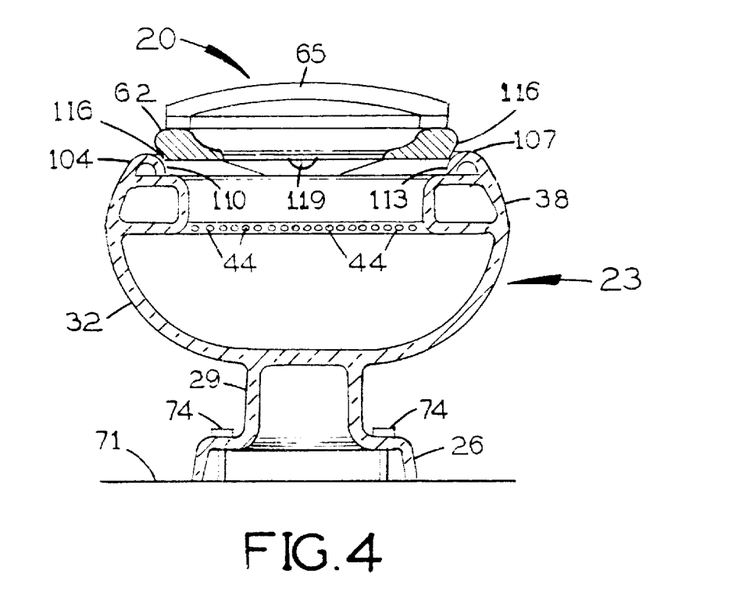
FIG. 4 is substantially a lateral vertical sectional view taken on the line 4—4 if FIG. 3 showing the, relationship of the intake manifolds to the bowl, the seat, and the seat cover.
Figure 5:
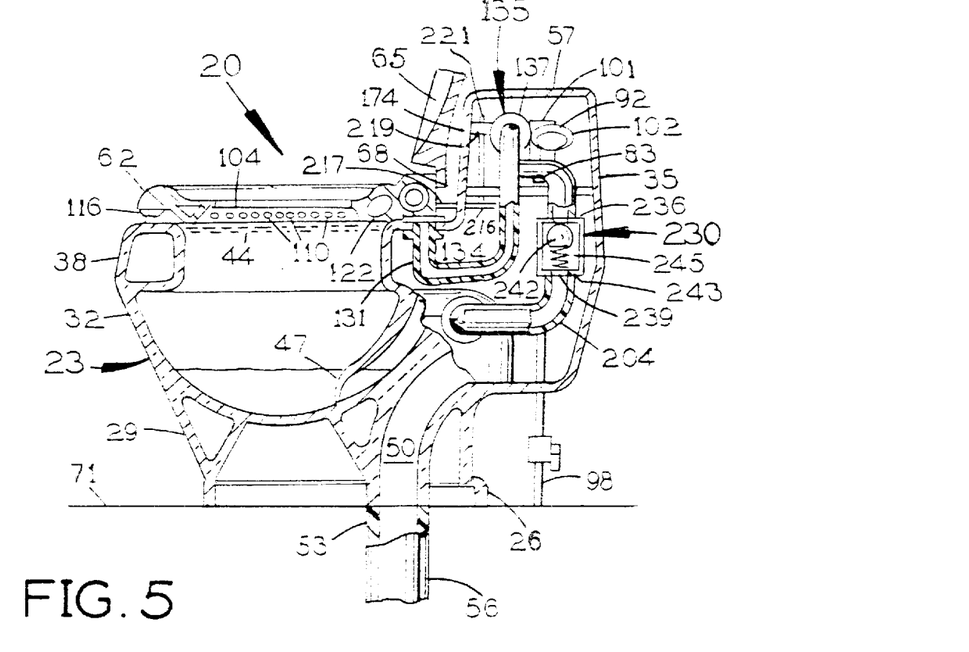
FIG. 5 is substantially a partial longitudinal sectional view of the toilet showing the configuration of the ventilation system in the toilet.
Figure 6:
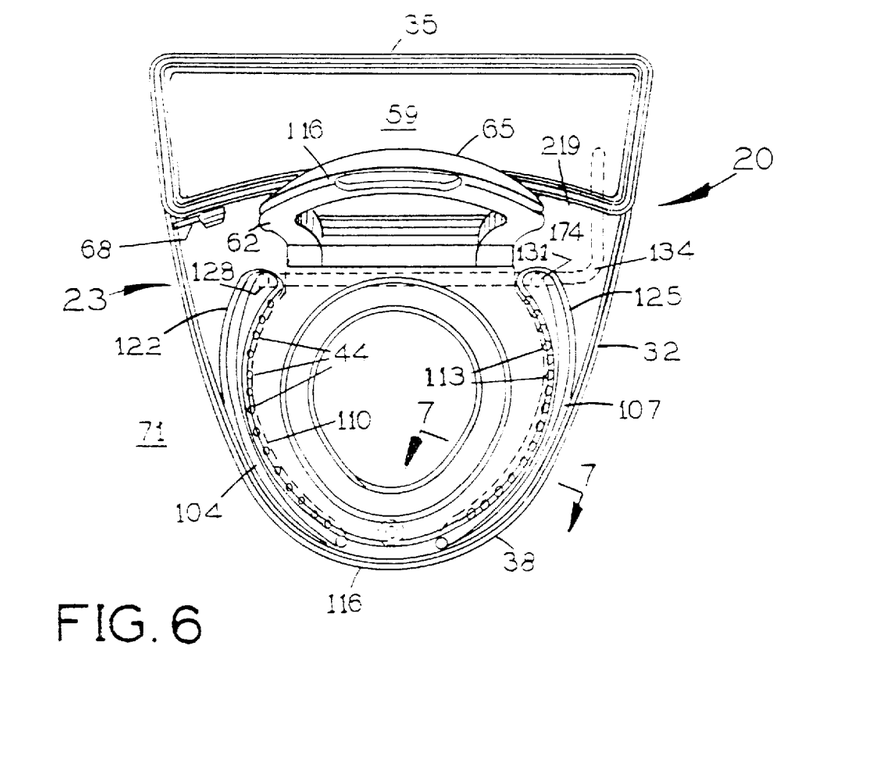
FIG. 6 is substantially a top plan view of the toilet with the seat cover elevated to the vertical position and the seat down partially covering the intake manifolds and the top periphery of the bowl.
Figure 7:
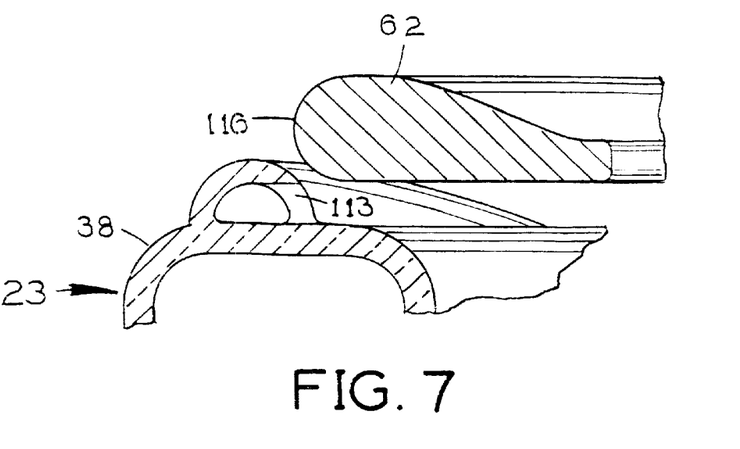
FIG. 7 is substantially a lateral vertical sectional view taken on the line 7—7 of FIG. 6 showing the mating of the outer periphery of the seat to the manifold.
Figure 8:
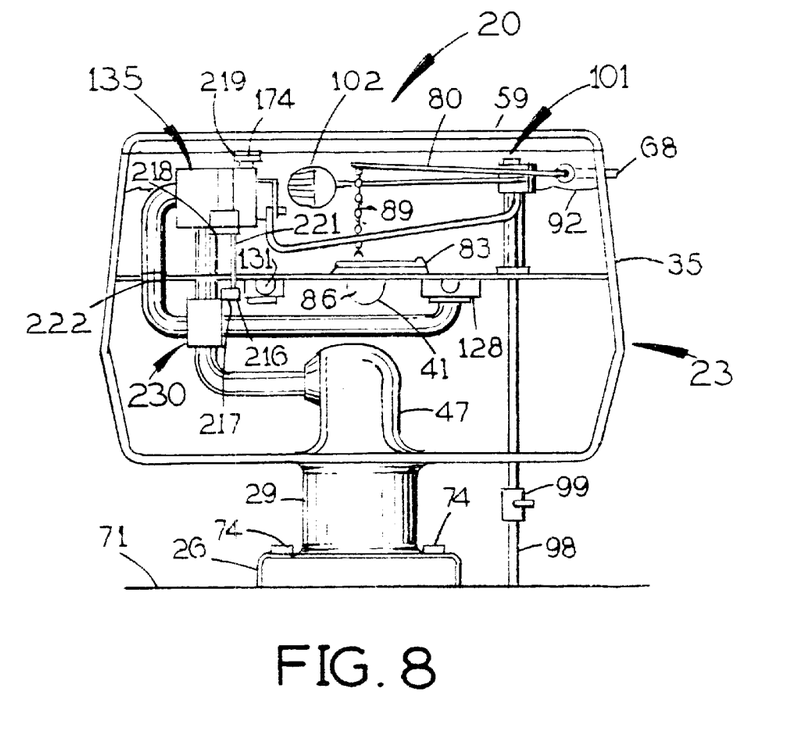
FIG. 8 is substantially a lateral vertical sectional view taken on the line 8—8 of FIG. 3 showing the ventilation system, and the connection to the siphoned discharge passage.
Figure 9:
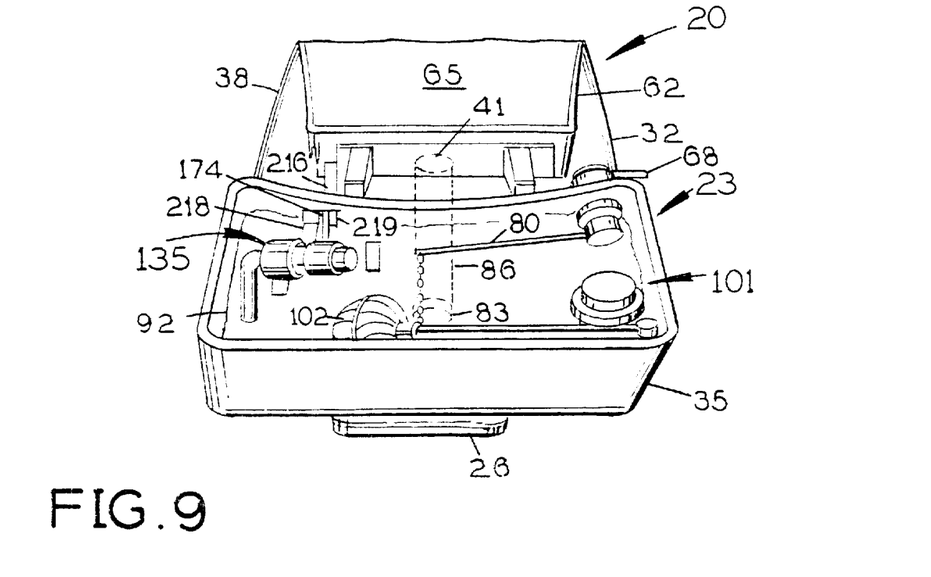
FIG. 9 is substantially a rear perspective view of the odorless toilet with the cover removed from the tank to show the conventional flushing components and the ventilation fan assembly.
Figure 10:
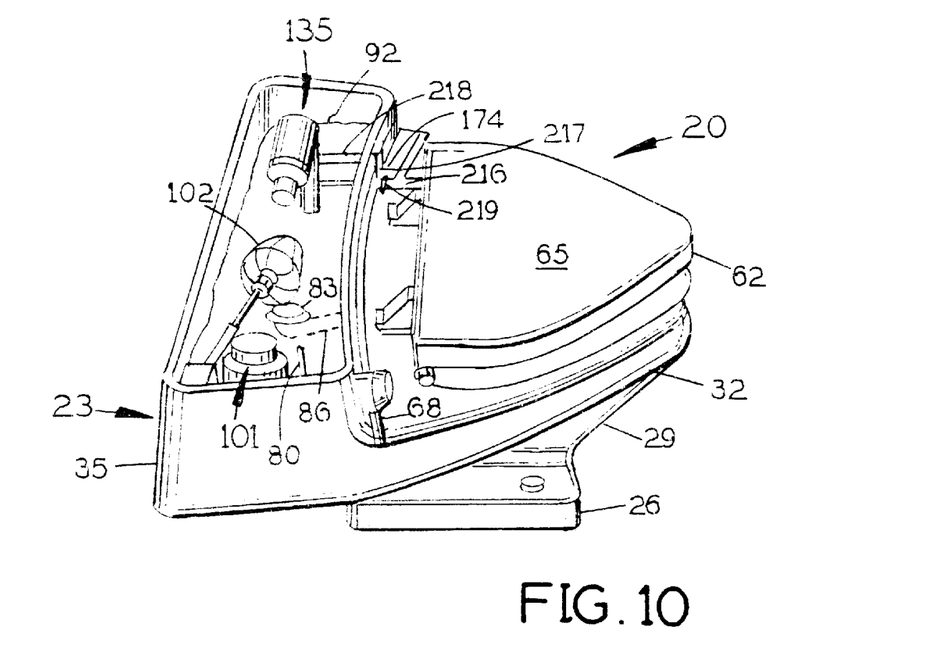
FIG. 10 is substantially a side perspective view corresponding to FIG. 9.
Figure 11:
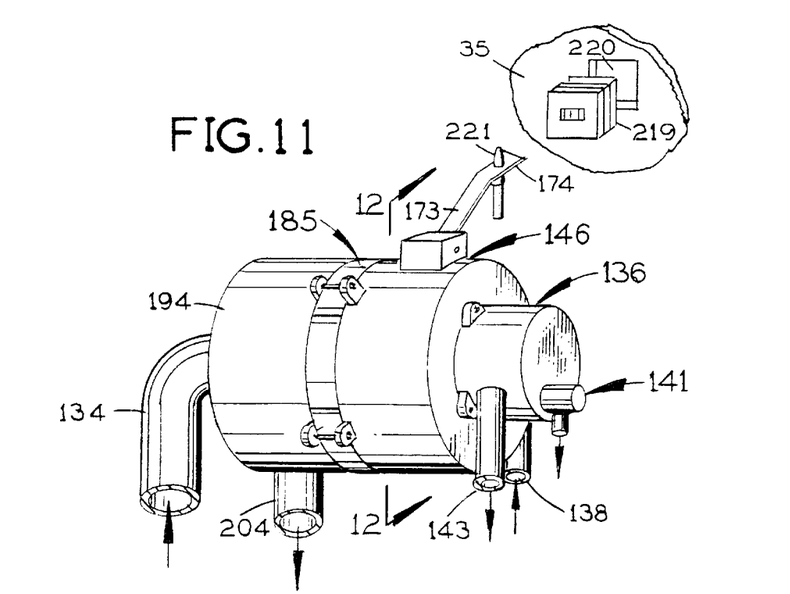
FIG. 11 is substantially a side perspective view of the ventilation fan assembly.
Figure 12:
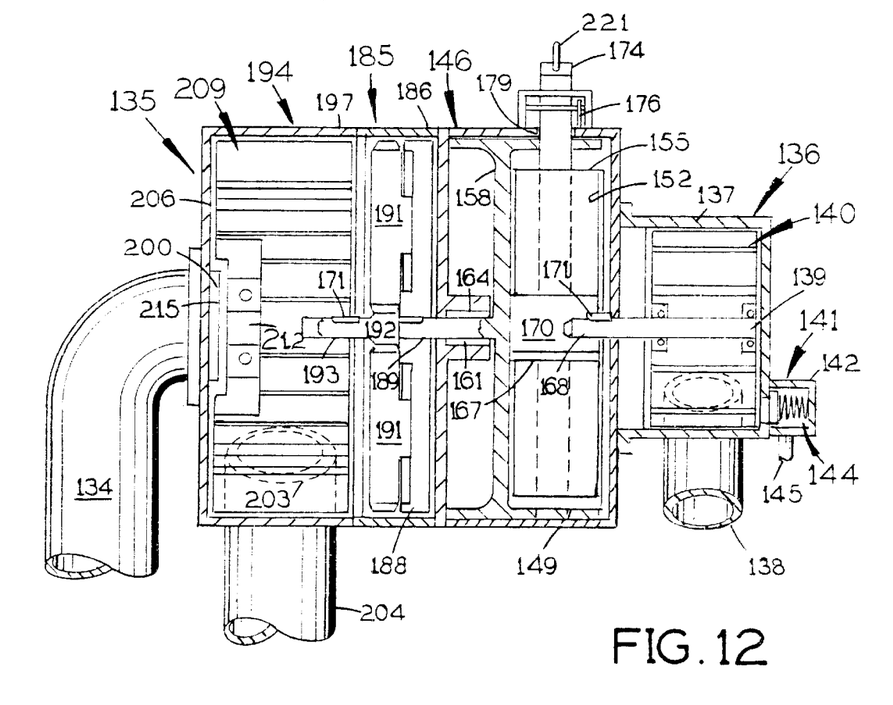
FIG. 12 is substantially a longitudinal vertical sectional view taken on the line 12—12 of FIG. 11 showing the details of the water motor, the clock spring motor assembly, the gear box, and the suction blower.

Basic Toilet: Referring to FIGS. 1–3, the self-contained venting toilet 20 of the present invention includes an integral porcelain or ceramic member 23 having a base 26, a central hollow pedestal section 29 forming a downward extension of the bowl section 32, and a water tank section 35. Bowl section 32 includes a hollow flush ring 38 having an inlet opening 41 and a plurality of flushing water discharge openings 44 facing inwardly into bowl section 32. A water trap 47 formed in bowl section 32 and base 26 extends to a siphoned discharge passage 50 and a toilet discharge outlet 53 to a sewer waste drain 56. A removable tank cover 59 of porcelain or ceramic material is disposed on top of tank section 35. A seat 62 and a seat cover 65 are pivotally mounted to the bowl section 32 with a pivotable flush control lever 68 which extends forwardly from the tank section 35. The base 26 is secured to the floor 71 by a plurality of bolts 74 which can be covered by a base cover (not shown) such as made of plastic.

Flushing Components: The flushing components and mechanisms of the toilet are basically standard as shown best in FIGS. 5, 8, 9, and 10. They include a flush arm 80 connected to the flush control lever 68 for movement therewith. A flapper valve 83 is pivotally connected to and covers a flush water outlet 86 within water tank section 35. A chain 89 connects the flapper valve 83 to the flush arm 80 to allow uncovering of the flush water outlet 86 to selectively release flushing water 92 from the tank section 35. A hose 95 is connected to water tank section 35 and to flush ring 38 at inlet opening 41 to route the flushing water 92 from water tank section 35 into flush ring 38 and out through flushing water outlet openings 44 into bowl section 32, water trap 47, siphoned discharge passage 50, toilet discharge outlet 53, and into sewer waste drain 56 of the sewer system (not shown). Flushing water 92 is replenished in tank section 35 from a water supply pipe 98 having a valve 99 interposed there along which connects from a source of pressurized water to a float controlled water flow control valve 101 having a float 102 to control the water level within tank section 35.

Flushing Operation

Toilet 20 is flushed by pressing the flush control lever 68 which pivots the flush arm 80 to lift and open the flapper valve 83 by means of chain 89. This releases flushing water 92 from the tank section 35 through hose 95 into flush ring 38 for delivery through flushing water discharge openings 44 and then through the bowl section 35 and water trap 47 to siphoned discharge passage 50 and toilet discharge outlet 53 into sewer waste drain 56. The flapper valve 83 closes when most of the flushing water 92 has drained from tank section 35, and the water is replenished from the water supply pipe 98 through the water flow control valve 101 until float 102 rises to the desired level.

Modifications for the Vented Toilet

The self-contained venting toilet 20 includes modifications from that of a standard toilet which permit ventilation of the bowl section 35.

Manifolds and Riser Tube: A first modification to the self-contained venting toilet 20 from a standard toilet is the addition of a pair of arcuate intake manifolds 104 and 107 which are mounted opposite one another on flush ring 38 of the bowl section 32. A plurality of intake ports 110 and 113 are arranged around the intake manifolds 104 and 107 adjacent an outer edge 116 of seat 62. The seat 62 may be arranged to bear directly on the intake manifolds 104 and 107, or may be positioned in the usual manner on a plurality of somewhat compressible pads 119 affixed to seat 62. Respective rear portions 122 and 125 of intake manifolds 104 and 107 terminate in downwardly extending conduits 128 and 131 and a riser tube 134.

Ventilation Fan Assembly: Another modification to the self-contained venting toilet 20 from a standard toilet is the addition of a ventilation fan assembly 135 disposed within water tank section 35.

Fluid Motor: Ventilation fan assembly 135 includes a standard fluid motor 136 having a housing 137. Fluid motor 136 is connected to a pipe 138 which connects water flow control valve 101 thereto to receive flushing water 92 from water supply pipe 98. A power output shaft 139 of a vaned disk 140 of fluid motor 136 extends therefrom such that when flushing water 92 flows through fluid motor 136, vaned disk 140 through power output shaft 139 supplies power for ventilation fan assembly 135 when flushing water 92 is flowing therethrough for discharge through pipe 138 into water, tank section 35. Valve 99 can be used to control the amount and pressure of flushing water 92 to fluid motor 136 to control the rotational speed thereof. An overpressure valve 141 includes a housing 142 which threadably connects to fluid motor 136, and which communicates with the flushing water 92 which flows therethrough. When the pressure builds to a predetermined level, a spring-loaded check member 144 opens to allow the flushing water 92 to exit fluid motor 140 through an overpressure pipe 145.

Clock Spring Motor Assembly: Ventilation fan assembly 135 further includes an energy storage device in the form of a clock spring motor assembly 146, which includes a housing 149 which is bolted to fluid motor 136. Disposed within housing 149 is at least one spiral clock spring 152 which has an outer end 155 affixed to a tubular spring housing 158 rotationally disposed within housing 149 on an output shaft 161 supported by a pair of bushings 164 connected to housing 149. Clock spring 152 further includes an inner end 167 having a socket 168 which is affixed to a stub shaft 170 connected to the output shaft 143 of fluid motor 136 by a key 171 for rotation therewith. A lock pawl 173 having a bent engaging end (not shown) and an elongate lever end 174 is pivotally mounted to housing 149, being spring-loaded by means of a torsion spring 176 to extend through a hole 179 through housing 149 to individually engage a plurality of peripheral holes 182 through tubular spring housing 158 to restrain rotation thereof during winding of clock spring 152. Lock pawl 173 is configured such that the engaging end disengages from spring housing 158 when lever end 174 is raised and to reengage when lowered.

Gear Box: Ventilation fan assembly 135 further includes a planetary gear box 185 having a housing 186 which is bolted to housing 149. Gear box 185 includes a large outer gear 188 having an input socket 189 to which output shaft 161 is connected using a key 171. A plurality of planet gears 191 interconnect outer gear 188 and a sun gear 192 having an output shaft 193 within gear box 185, output shaft 193 which extends from housing 186. Planet gears 191 rotationally interconnect outer gear 188 to sun gear 192 with output shaft 161 to produce an increase in revolutions between the input socket 189 and output shaft 161 of between about one to two and one to fifty.

Suction Blower: Ventilation fan assembly 135 further includes a squirrel cage or centrifugal suction blower 194 having a housing 197 which is bolted to gear box 185. Housing 197 includes an intake 200 connected to riser tube 134 and an exhaust 203 connected to an outlet conduit 204, with a central rotor chamber 206. A vaned rotor 209 is rotationally disposed within rotor chamber 206 by means of a shaft 212 of vaned rotor 209 which is supported on a pair of bushings 215 connected to housing 197. Shaft 212 is connected to output shaft 161 of gear box 185 so as to be powered thereby. The use of the gear box 185 allows vaned rotor 205 to spin at a higher speed than without which provides added air drag to extend the amount of time and odorous gases moved before clock spring 152 unwinds.

Toilet Seat: Another modification to the self-contained venting toilet from a standard toilet is the addition of a rearwardly extending lever arm 216 to seat 62, which extends through a hole (not shown) through ceramic member 23 below water tank section 35, with a resilient grommet 217 disposed in the hole around arm 216. Lever arm 216 is pivotally connected to seat 62 through a limited range of included angles of between about zero degrees and one-hundred-eighty-degrees. This allows lever arm 216 to remain in a generally horizontal position as seat 62 is raised to a vertical position and lowered to a horizontal position, but tilts lever arm 216 upwardly when weight is applied to the horizontal seat 216 and compresses pads 119 such as when a person sits thereon.

Mounting and Connection of the Ventilation Fan Assembly

Ventilation fan assembly 135 is mounted within tank section 35 of ceramic member 23 using a mounting bracket 218. Lock pawl 173 extends through a resilient grommet 219 disposed in a rectangular hole 220 through water tank section 35. Lever arm 216 of seat 62 is connected to lever end 174 of lock pawl 173 by a rod 221 secured to lever arm 216 which extends through a seal (not shown) into water tank section 35 for vertical movement therewith such as by nuts (not shown) threaded thereon, and to lever end 174 lock pawl 173 but only to move upwardly, such as by a washer (not shown) secured therebelow. Therefore, when lever arm 216 rises in response to a person sitting on seat 62, lever end 174 of lock pawl 173 is also raised. However, when lever arm 216 is not raised, lever end 174 can still be raised without also raising lever arm 216. This permits actuation of ventilation assembly 137 even when a person is not sitting on seat 62. Riser tube 134 extends from outside of tank section 35 through a seal 222, to prevent leakage of flushing water 92, and communicates with intake 200 of centrifugal fan assembly 194. The output of the fan assembly 135 is delivered from output 203 through conduit 204 into air inlet 227 of base 26 which communicates with siphoned discharge passage 50 past water trap 47 leading to toilet discharge outlet 53 and sewer waste drain 56. The outlet conduit 204 is provided with a one-way or check valve 230 providing for one-way passage of exhausted gases away from the bowel section 32 in a direction toward the toilet discharge outlet 53 and sewer waste drain 56. Check valve 230 can be of any of a variety of suitable designs, the design shown being a ball type check valve having a cylindrical housing 233 with an inlet 236, and an outlet 239. A light-weight ball 242 is disposed within an inner chamber 245 of check valve 230, inlet 236 having a seat 248 of matching radius to ball 242. A compression spring 243 retains ball 242 against seat 248 while fan assembly 135 is stopped. Ball 242 lowers against spring 243 under the air pressure generated by the fan assembly 135 such that gases are free to move past ball 242. Loss of fan pressure allows spring 243 to reseat ball 242 which results in closure of the valve 230, which prevents any passage of gases from the sewer waste drain 56 back through the fan assembly 135 and the riser tube 143 where they can emerge into the room via the intake manifolds 104 and 107 under the seat 62.

Operation of the Vented Toilet

Initial Winding of Clock Spring Motor: Vented toilet 20 is initially operated to store energy in clock spring motor assembly 146 by actuating flush control lever 68, which pivots the flush arm 80 to lift and open the flapper valve 83 to drain the flushing water 92 from water tank section 35. This causes float 102 to drop, signaling water flow control valve 101 to open, starting the flow of flushing water 92 through water supply pipe 98. The flushing water 92 flowing through water supply pipe 98 powers fluid motor 136 rotates the vaned disk 140 and the power output shaft 143, which winds spiral clock spring 152 of the clock spring motor assembly 146. Lock pawl 173 is engaged with tubular spring housing 158 to prevent clock spring 152 from unwinding. When clock spring 152 is completely wound, a process which takes less time than the time to refill water tank section 35, the rotor of fluid motor 136 cannot rotate further and the water pressure builds within fluid motor 136 until pressure relief valve 141 opens to allow the remaining flushing water to bypass fluid motor 136 and flow directly into water tank section 35. This winding process occurs during every flushing of toilet 20 to keep clock spring 152 wound for subsequent ventilation cycles.

Using the Ventilation System: Ventilation fan assembly 135 can be actuated either by a person sitting on seat 62, or by actuating lock pawl 173. When a person sits on seat 62, this causes pads 119 to compress under the weight of the person applied to seat 62, which causes seat 62 to tilt forwardly a slight amount which tilt is transmitted and amplified by the length of lever arm 216 into an upward movement which actuates pawl 173 through rod 221. In either case, actuation of lock pawl against the bias of torsion spring 176 releases tubular spring housing 158 to rotate on output shaft 161 thereof to drive sun gear 188 of gear box 185. The outer gear 192, planetary gears 191, and sun gear 193 produce an increased rotational speed at output shaft 193 which is connected to vaned rotor 209 of blower 194. Odorous gases are drawn from bowl section 32 through intake ports 110 and 113 of the respective intake manifolds 104 and 107, through the respective conduits 128 and 131, riser tube 134, and into blower 194. The odorous gases are expelled by blower 194 through exhaust 203 through conduit 204 and check valve 230, air inlet 227 of base 26, siphoned discharge passage 50, toilet discharge outlet 53, and out through sewer waste drain 56. Check valve 230 prevents exhausted odorous gases and other sewer gases from moving backwardly from sewer waste drain 56 toward bowel section 32. Blower 194 of ventilation fan assembly 135 stops running either when clock spring 152 is unwound, or when the person rises from seat 32, which allows pawl 173 to be biased by torsion spring 176 against tubular spring housing 158.

CONCLUSION

It can now be seen that the present invention solves many of the problems associated with the prior art. The present invention utilizes the existing source of water necessary to operate a toilet to eliminate odorous gases from toilets, capturing water flow energy which is normally wasted. The present invention requires no external or internal source of electricity such as a wall socket or batteries needing periodic replacement are required, and presenting no electrical shock hazard. The present invention is adaptable to most standard toilet designs, either manufactured as an integral part of the toilet, or as an add-on or kit for preexisting toilet design and toilets already installed. The present invention has the ability to extract and store energy from the flow of water during flushing and subsequent refilling of the flush water tank for later use when there is no water flow. The present invention has the ability to capture odorous gases before having a chance to enter the bathroom or other room wherein the toilet is located. The present invention eliminates the exhausting a large volume of heater or air conditioned air during use. The present invention eliminates the need to cut holes in walls and in the ceiling for an exhaust fan, wall switches, and the associated electrical wiring.

Although the description above contains many specifications, these should not be construed as limiting the scope of the invention but as merely providing illustrations of some of presently preferred embodiments of this invention. The specification, for instance, makes reference to toilets. However, the present invention is not intended to be limited to toilets. Rather it is intended that the present invention can be used with urinals and other such devices which use water and which contain odorous gases. While the ventilation fan assembly is shown as being actuatable by both the sitting of a person on the toilet, and independently by moving the end of the pawl which extends through the tank other ways of actuating can be used. For example, the pawl can be connected to the flush control lever by the appropriate mechanism for actuation when a person flushes the toilet. Likewise, while a centrifugal suction blower is preferred due to the efficiency and compactness thereof, the present invention can be used such as with axial suction blowers, and other types of blowers. Also, while a ball type one-way valve is shown other such one-way valves can be used such as those using a resilient flap which covers an air flow hole. Finally, while the odorous gases are shown to be exhausted to the sewer system, such gases could be exhausted to a conduit leading to the outside of the building, particularly where the ventilation system is an add-on to an existing installed toilet. The energy storage device can be other than of the clock spring motor type shown. For example, potential energy can be stored such as in rubber bands, other types of springs, and even as water in a separate tank which is filled during refilling of the flushing tank, such separate tank which feeds a water motor or turbine by opening a valve therebetween to power the blower. Thus, the scope of the invention should be determined by the appended claims and their legal equivalents rather than by the examples given.

What is claimed is:

1. A ventilation system for removing odors from a water closet or toilet, the toilet having a water supply tank, a bowl with a hollow flush ring manifold adjacent the top of the bowl having an inlet opening and a plurality of flushing water discharge openings facing inwardly into the bowl, a flushing conduit communicating between the bowl and the tank, a discharge conduit communicating with the bowl and a siphon outlet adapted for connection to a sewage waste drain, the discharge conduit including an odor trap to keep odors from passing from the sewage waste drain and the bowl, a water control mechanism adapted to control a supply of water under pressure from an external water supply pipe and a level of flushing water within the tank, a flushing mechanism with a valve controlled outlet to the flushing conduit and the flush ring manifold adapted to discharge the contents of the tank to the bowl, a seat pivotally mounted on the bowl for movement between a horizontal position over the bowl and an elevated substantially vertical position at the rear of said bowl and adjacent the tank, the ventilation system being adapted to exhaust gases from within the bowl to the siphon outlet and into the sewage waste drain, comprising:

an exhaust conduit communicating between the bowl and the siphon outlet;

a blower assembly operatively connected to and powered by the supply of water from the external water supply pipe when said water control mechanism is allowing the flow of water under pressure from the external water supply pipe to refill the level of flushing water within the tank, said blower assembly being interposed along said exhaust conduit to induce a flow of air within said exhaust conduit toward the siphon outlet and into the sewage waste drain;

a fluid motor which is operatively connected to a centrifugal blower of the blower assembly, wherein said fluid motor is connected to the external water supply pipe to utilize the water under pressure therein to rotate said centrifugal blower to induce the flow of air within the exhaust conduit; and an energy storage device which extracts and stores kinetic energy taken from the fluid motor when the flushing water is flowing through and when the water control mechanism is allowing the flow of water under pressure from the external water supply pipe to refill the level of flushing water within the tank, said energy storage device uses the stored kinetic energy to power the centrifugal blower when the ventilation system is in use, even when the flushing water is not flowing through the fluid motor.

2. The ventilation system of claim 1, wherein the exhaust conduit communicates with the bowl through an elongate intake manifold adjacent the top of the bowl and extending around at least a portion of the periphery of said bowl, said intake manifold having a plurality of intake holes.

3. The ventilation system of claim 2, wherein the intake manifold is integral with the a bowl.

4. The ventilation system of claim 2, wherein a pair of elongate intake manifolds adjacent the top of the bowl and extending at opposite sides of the bowl around at least a portion of the periphery of the bowl, said intake manifolds each having a plurality of intake holes.

5. The ventilation system of claim 1, wherein the fluid motor is operatively connected to power the centrifugal blower of the blower assembly through a gear box.

6. The ventilation system of claim 5, wherein the gear box provides an increase in rotational speed of the centrifugal blower relative to the fluid motor.

7. The ventilation system of claim 1, further comprising a one-way valve interposed along the exhaust conduit to prevent the flow of air within said exhaust conduit away from the siphon outlet and back into the bowl.

8. The ventilation system of claim 1, wherein the energy storage device utilizes at least one spring to store the kinetic energy as potential energy.

9. The ventilation system of claim 8, wherein the energy storage device comprises a clock spring motor assembly having at least one spiral clock spring.

10. The ventilation system of claim 9, wherein the clock spring motor is operatively connected to power the contrifugal blower of the blower assembly through a gear box.

11. The ventilation system of claim 1, wherein the energy storage device includes a release mechanism which locks said energy storage device from releasing kinetic energy stored as potential energy until release thereof is desired.

12. The ventilation system of claim 11, wherein the release mechanism is operatively connected to the seat for actuation when a person sits on the seat.

13. The ventilation system of claim 11, wherein the release mechanism is actuated by a lever thereof which is accessible externally of the toilet.

14. The ventilation system of claim 11, wherein the release mechanism is operatively cnnected to the flushing mechanism for actuation when the flushing mechanism is actuated, the flushing mechanism being actuatable externally of the toilet.

15. The ventilation system of claim 11, wherein the release mechanism is actuated by a lever thereof which is accessible externally of the toilet and separately from the flushing mechanism.

16. An odorless water closet or toilet for connection to an external water supply pipe and to a sewage waste drain, comprising:

- a toilet having a water supply tank, a bowl with a hollow flush ring manifold adjacent the top of said bowl having an inlet opening and a plurality of flushing water discharge openings facing inwardly into said bowl, a flushing conduit communicating between said bowl and said tank, a discharge conduit communicating with said bowl and a siphon outlet adapted for connection to the sewage waste drain, said discharge conduit including an odor trap to keep odors from passing from the sewage waste drain to said bowl, a water control mechanism adapted to control a supply of water from the external water supply pipe and a level of flushing water within said tank, a flushing mechanism with a valve controlled outlet to the flushing conduit and flush ring manifold adapted to discharge the flushing water contained in said tank to said bowl, a seat pivotally mounted on the bowl for movement between a horizontal position over said bowl and an elevated substantially vertical position at the rear of said bowl and adjacent said tank;
- a ventilation system adapted to exhaust gases from within said bowl to said siphon outlet and into the sewage waste drain, which ventilation system includes an exhaust conduit communicating between said bowl and said siphon outlet, and a blower assembly interposed along said exhaust conduit adapted to induce flow of air within said exhaust conduit toward said siphon outlet and into the sewage waste drain;
- wherein the ventilation system further comprises a fluid motor which is operatively connected to a centrifugal blower of the blower assembly, wherein said fluid motor is connected to the external water supply pipe to utilize the water under pressure therein to rotate said centrifugal blower to induce the flow of air within the exhaust conduit: and
- wherein the ventilation system further comprises an energy storage device which extracts and stores kinetic energy taken from the fluid motor when the flushing water is flowing through and when the water control mechanism is allowing the flow of water under pressure from the external water supply pipe to refill the level of flushing water within the tank, said energy storage device uses the stored kinetic energy to power the centrifugal blower when the ventilation system is in use, even when the flushing water is not flowing through the fluid motor.

17. The odorless toilet of claim 16, wherein the exhaust conduit communicates with the bowl through an elongate intake manifold adjacent the top of the bowl and extending around at least a portion of the periphery of said bowl, said intake manifold having a plurality of intake holes along the length thereof.

18. The odorless toilet of claim 16, wherein the fluid motor is operatively connected to power the fan of the blower assembly through a gear box.

19. The odorless toilet of claim 16, wherein the ventilation system further comprises a one-way valve interposed along the exhaust conduit to prevent the flow of air within said exhaust conduit away from the siphon outlet and back into the bowl.

20. The odorless toilet of claim 16, wherein the energy storage device utilizes at least one spring to store the kinetic energy as potential energy.

21. The odorless toilet of claim 16, wherein the energy storage device includes a release mechanism which locks said energy storage device from releasing kinetic energy stored as potential energy until release thereof is desired.

* * * * *